(12) United States Patent
Booth (10) Patent No.: US 7,840,753 B1
(45) Date of Patent: Nov. 23, 2010

(54) HARD DISK DRIVE AS HYBRID DRIVE

(75) Inventor: Jing Booth, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 533 days.

(21) Appl. No.: 11/899,477

(22) Filed: Sep. 6, 2007

Related U.S. Application Data (60) Provisional application No. 60/824,829, filed on Sep. 7, 2006.

(51) Int. Cl.
*G06F 12/00* (2006.01)
(52) U.S. Cl. .................................... 711/113
(58) Field of Classification Search ........................ None
See application file for complete search history.

(56) References Cited

U.S. PATENT DOCUMENTS

| | | | |
|---|---|---|---|
| 7,082,495 B2 | 7/2006 | DeWhitt et al. | |
| 7,099,993 B2 * | 8/2006 | Keeler | 711/113 |
| 7,610,438 B2 * | 10/2009 | Lee et al. | 711/103 |
| 2007/0038850 A1 * | 2/2007 | Matthews et al. | 713/1 |
| 2008/0126785 A1 * | 5/2008 | Chong et al. | 713/2 |

\* cited by examiner

*Primary Examiner*—Hiep T Nguyen (57) ABSTRACT

A hard disk drive (HDD) controller comprises a channel module and a control module. The channel module reads and writes data to a magnetic medium. The control module defines non-overlapping first and second areas of the magnetic medium, receives a write request containing first data for a first address in the first area, and caches the first data at a second address in the second area before storing the first data at the first address.

71 Claims, 8 Drawing Sheets

HARD DISK DRIVE AS HYBRID DRIVE

CROSS-REFERENCE TO RELATED APPLICATIONS

This application claims the benefit of U.S. Provisional Application No. 60/824,829, filed on Sep. 7, 2006. The disclosure of the above application is incorporated herein by reference in its entirety.

FIELD

The present disclosure relates to hard disk drives, and more particularly to hard disk drives with nonvolatile cache.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Figure 1:
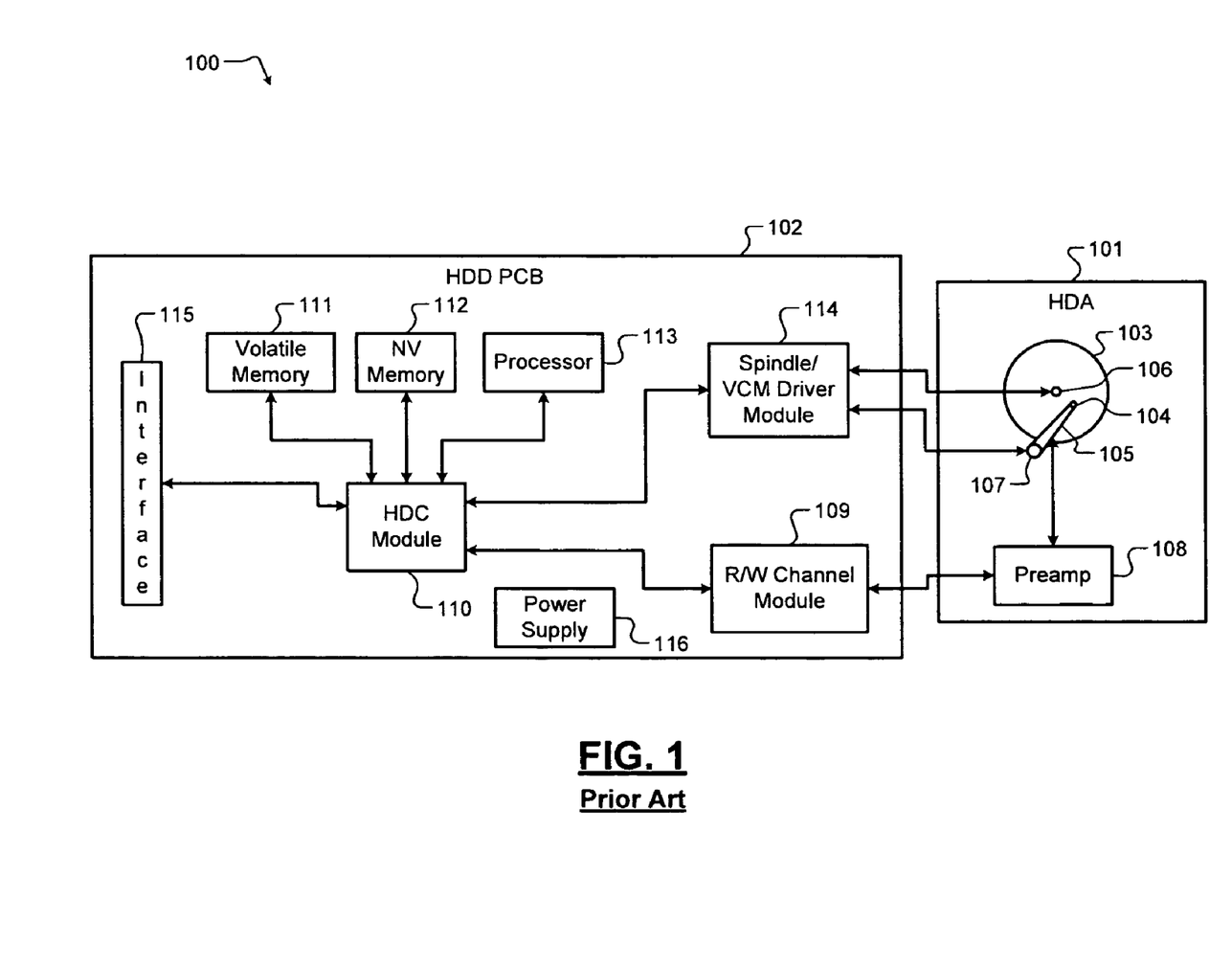
FIG. 1 is a functional block diagram of a hard disk drive (HDD) according to the prior art.

Referring now to FIG. 1, a functional block diagram of a hard disk drive (HDD) 100 is depicted. The HDD 100 includes a hard disk assembly (HDA) 101 and a HDD printed circuit board (PCB) 102. The HDA 101 may include a magnetic medium 103, such as one or more platters that store data, and a read/write device 104. The read/write device 104 may be arranged on an actuator arm 105 and may read and write data on the magnetic medium 103.

Additionally, the HDA 101 includes a spindle motor 106 that rotates the magnetic medium 103 and a voice-coil motor (VCM) 107 that actuates the actuator arm 105. A preamplifier device 108 amplifies signals generated by the read/write device 104 during read operations and provides signals to the read/write device 104 during write operations.

The HDD PCB 102 includes a read/write channel module (hereinafter, "read channel") 109, a hard disk controller (HDC) module 110, volatile memory 111, nonvolatile memory 112, a processor 113, and a spindle/VCM driver module 114. The read channel 109 processes data received from and transmitted to the preamplifier device 108.

The HDC module 110 controls components of the HDA 101 and communicates with a host device (not shown) via an I/O interface 115. The host device may include a computer, a multimedia device, a mobile computing device, etc. The I/O interface 115 may include wireline and/or wireless communication links.

The HDC module 110 may receive data from the HDA 101, the read channel 109, volatile memory 111, nonvolatile memory 112, the processor 113, the spindle/VCM driver module 114, and/or the I/O interface 115. The processor 113 may process the data, including encoding, decoding, filtering, and/or formatting.

The processed data may be output to the HDA 101, the read channel 109, volatile memory 111, nonvolatile memory 112, the processor 113, the spindle/VCM driver module 114, and/or the I/O interface 115. The spindle/VCM driver module 114 controls the spindle motor 106 and the VCM 107. The HDD PCB 102 includes a power supply 116 that provides power to the components of the HDD 100. The HDC module 110 may use volatile memory 111 and/or nonvolatile memory 112 to store data related to the control and operation of the HDD 100.

Volatile memory 111 may include dynamic random access memory (DRAM), synchronous DRAM, Rambus DRAM, etc. Nonvolatile memory 112 may include flash memory (including NAND and NOR flash memory), static RAM, magnetic RAM, phase change memory, and multi-state memory, in which each memory cell has more than two states.

Figure 2:
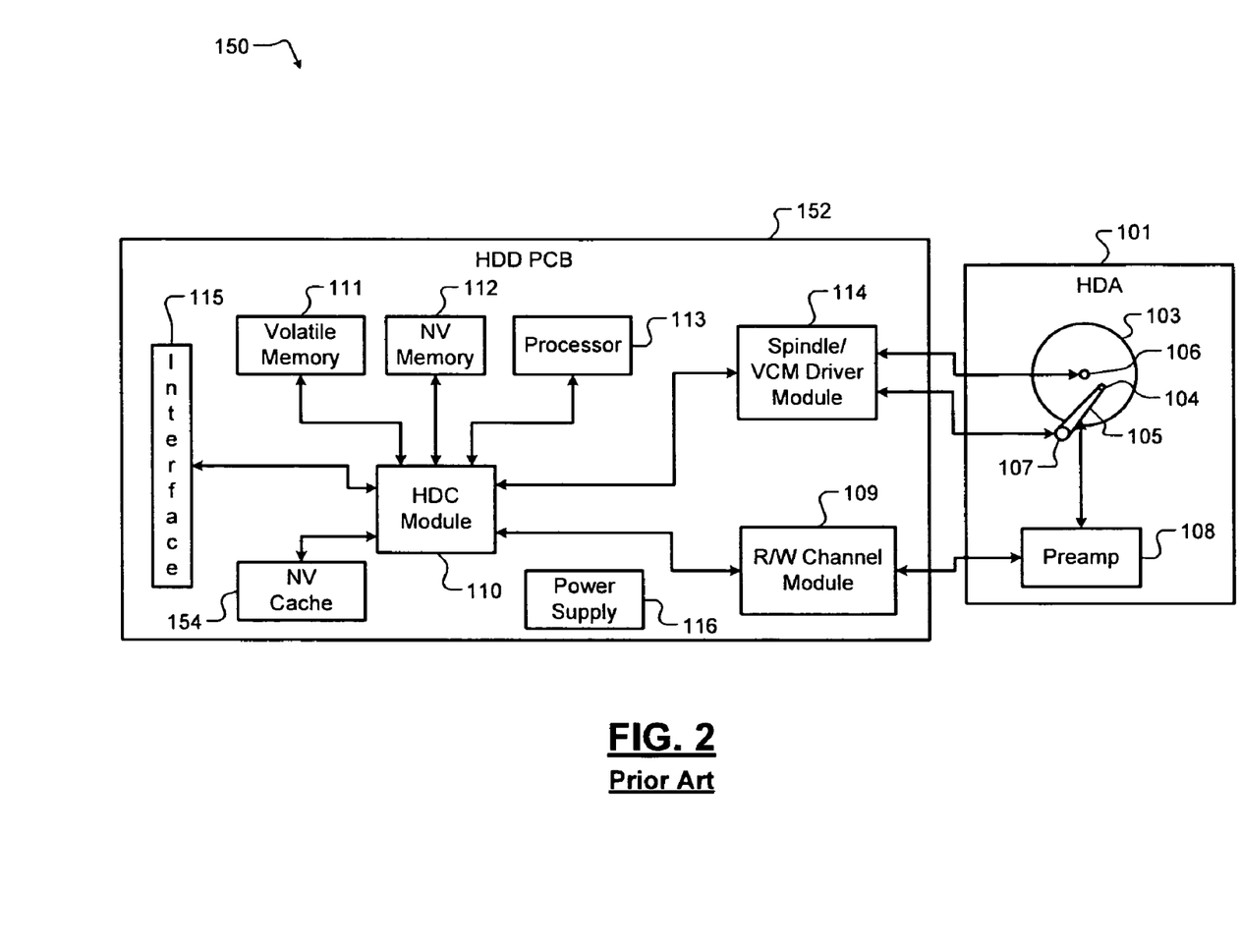
FIG. 2 is a functional block diagram of a hybrid HDD according to the prior art.

Referring now to FIG. 2, a functional block diagram of a hybrid HDD 150 is depicted. An HDD PCB 152 of the hybrid HDD 150 includes nonvolatile cache 154, which communicates with the HDC module 110. The nonvolatile cache 154 may include any suitable type of nonvolatile memory, such as flash memory. The nonvolatile cache 154 may store data waiting to be written to the HDA 101, data waiting to be read by the I/O interface 115, and/or temporary values.

The HDA 101 can be powered down, and data waiting to be written to the HDA 101 can be cached in the nonvolatile cache 154. Once the nonvolatile cache 154 fills with data waiting to be written, and/or upon the occurrence of other conditions, the HDA 101 is powered up and the cached data is written to the HDA 101.

Powering down the HDA 101 saves power and makes the hybrid HDD 150 less prone to failure as a result of impact and vibration. The nonvolatile cache 154 can also cache frequently accessed data. When this data is requested by the I/O interface 115, the data can be provided quickly from the nonvolatile cache 154 without delays due to seeking and rotational latencies of the HDA 101.

The nonvolatile cache 154 can also store data that allows the host device associated with the hybrid HDD 150 to quickly resume from a powered down state. When the host device is powered down or placed in hibernate mode, resume data required to quickly power up the host device can be stored in the nonvolatile cache 154. The resume data may include certain data stored in the HDA 101, the addresses of which are referred to as a pinned set. When hibernating, the resume data may include some or all of the contents of volatile memory of the host device.

In order to support these features, the nonvolatile cache 154 typically contains a large amount of nonvolatile semiconductor storage. For example only, the nonvolatile cache 154 may include 256 megabytes or 512 megabytes of storage. Nonvolatile semiconductor storage is typically expensive and typically also has a finite lifetime.

SUMMARY

A hard disk drive (HDD) controller comprises a channel module and a control module. The channel module reads and writes data to a magnetic medium. The control module defines non-overlapping first and second areas of the magnetic medium, receives a write request containing first data for a first address in the first area, and caches the first data at a second address in the second area before storing the first data at the first address.

In other features, the second area comprises outer tracks of the magnetic medium and the first area comprises inner tracks of the magnetic medium. The control module receives a read request for the first address and selectively responds with data from the second address. The control module caches frequently accessed data in the second area. The control module maintains an index of addresses currently cached within the second area.

In further features, the control module stores the index within a subarea of the second area. The control module caches data corresponding to a first set of addresses in the second area. The first set of addresses are located in the first area. The control module receives the first set of addresses from a host. The control module stores the data corresponding to the first set of addresses sequentially in a predetermined order in the second area, the predetermined order being based upon an order of expected retrieval.

In still other features, the control module caches data corresponding to a second set of addresses in the second area prior to shutting down. The second set of addresses are located in the first area. The control module receives the second set of addresses from a host. The control module stores the data corresponding to the second set of addresses sequentially in a predetermined order in the second area, the predetermined order being based upon an order of expected retrieval. An HDD comprises the HDD controller and a hard disk assembly including the magnetic medium.

A method for operating a hard disk drive (HDD) controller comprises defining non-overlapping first and second areas of a magnetic medium; receiving at the HDD controller a write request containing first data for a first address in the first area; and caching the first data at a second address in the second area before storing the first data at the first address.

The second area comprises outer tracks of the magnetic medium and the first area comprises inner tracks of the magnetic medium. The method further comprises receiving a read request for the first address; and selectively responding with data from the second address. The method further comprises caching frequently accessed data in the second area. The method further comprises maintaining an index of addresses currently cached within the second area.

In other features, the method further comprises storing the index within a subarea of the second area. The method further comprises caching data corresponding to a first set of addresses in the second area. The first set of addresses are located in the first area. The method further comprises receiving the first set of addresses from a host. The method further comprises storing the data corresponding to the first set of addresses sequentially in a predetermined order in the second area, the predetermined order being based upon an order of expected retrieval.

In further features, the method further comprises caching data corresponding to a second set of addresses in the second area prior to shutting down. The second set of addresses are located in the first area. The method further comprises receiving the second set of addresses from a host. The method further comprises storing the data corresponding to the second set of addresses sequentially in a predetermined order in the second area, the predetermined order being based upon an order of expected retrieval.

A computer program stored for use by a processor for operating a hard disk drive (HDD) controller comprises defining non-overlapping first and second areas of a magnetic medium; receiving at the HDD controller a write request containing first data for a first address in the first area; and caching the first data at a second address in the second area before storing the first data at the first address.

The second area comprises outer tracks of the magnetic medium and the first area comprises inner tracks of the magnetic medium. The computer program further comprises receiving a read request for the first address; and selectively responding with data from the second address. The computer program further comprises caching frequently accessed data in the second area. The computer program further comprises maintaining an index of addresses currently cached within the second area.

In other features, the computer program further comprises storing the index within a subarea of the second area. The computer program further comprises caching data corresponding to a first set of addresses in the second area. The first set of addresses are located in the first area. The computer program further comprises receiving the first set of addresses from a host. The computer program further comprises storing the data corresponding to the first set of addresses sequentially in a predetermined order in the second area, the predetermined order being based upon an order of expected retrieval.

In further features, the computer program further comprises caching data corresponding to a second set of addresses in the second area prior to shutting down. The second set of addresses are located in the first area. The computer program further comprises receiving the second set of addresses from a host. The computer program further comprises storing the data corresponding to the second set of addresses sequentially in a predetermined order in the second area, the predetermined order being based upon an order of expected retrieval.

A hard disk drive (HDD) controller comprises channel means for reading and writing data to a magnetic medium; and control means for defining non-overlapping first and second areas of the magnetic medium, for receiving a write request containing first data for a first address in the first area, and for caching the first data at a second address in the second area before storing the first data at the first address.

In other features, the second area comprises outer tracks of the magnetic medium and the first area comprises inner tracks of the magnetic medium. The control means receives a read request for the first address and selectively responds with data from the second address. The control means caches frequently accessed data in the second area. The control means maintains an index of addresses currently cached within the second area. The control means stores the index within a subarea of the second area. The control means caches data corresponding to a first set of addresses in the second area.

In further features, the first set of addresses are located in the first area. The control means receives the first set of addresses from a host. The control means stores the data corresponding to the first set of addresses sequentially in a predetermined order in the second area, the predetermined order being based upon an order of expected retrieval. The control means caches data corresponding to a second set of addresses in the second area prior to shutting down.

In still other features, the second set of addresses are located in the first area. The control means receives the second set of addresses from a host. The control means stores the data corresponding to the second set of addresses sequentially in a predetermined order in the second area, the predetermined order being based upon an order of expected retrieval. An HDD comprises the HDD controller and a hard disk assembly including the magnetic medium.

A hybrid hard disk drive (HDD) controller comprises a channel module that reads and writes data to a magnetic medium; nonvolatile semiconductor (NVS) memory; and a control module that selectively caches data in the NVS memory, that defines non-overlapping first and second areas of the magnetic medium, that receives a write request containing first data for a first address in the first area, and that selectively caches the first data at a second address in the second area before storing the first data at the first address.

In other features, the second area comprises outer tracks of the magnetic medium and the first area comprises inner tracks of the magnetic medium. The control module receives a read request for the first address and selectively responds with data from the second address. The control module caches frequently accessed data in the second area. The control module maintains an index of addresses currently cached within the second area. The control module stores the index within a subarea of the second area.

In further features, the control module caches data corresponding to a first set of addresses in the second area. The addresses of the first set of addresses are located in the first area. The control module receives the first set of addresses from a host. The control module stores the data corresponding to the first set of addresses sequentially in a predetermined order in the second area, the predetermined order being based upon an order of expected retrieval.

In still other features, the control module caches data corresponding to a second set of addresses in the second area prior to shutting down. The addresses of the second set of addresses are located in the first area. The control module receives the second set of addresses from a host. The control module stores the data corresponding to the second set of addresses sequentially in a predetermined order in the second area, the predetermined order being based upon an order of expected retrieval. The control module suspends caching data in the NVS memory when a usable lifetime of the NVS memory has expired.

In other features, the hybrid HDD controller further comprises a life monitor module that determines when the usable lifetime of the NVS memory has expired. The life monitor module monitors cumulative usage of the NVS memory to determine when the usable lifetime has expired. The control module begins caching data in the second area when a usable lifetime of the NVS memory has expired. A hybrid HDD comprises the hybrid HDD controller and a hard disk assembly including the magnetic medium.

A method for operating a hybrid hard disk drive (HDD) controller comprises selectively caching data in nonvolatile semiconductor (NVS) memory; defining non-overlapping first and second areas of the magnetic medium; receiving at the hybrid HDD controller a write request containing first data for a first address in the first area; and selectively caching the first data at a second address in the second area before storing the first data at the first address.

In other features, the second area comprises outer tracks of the magnetic medium and the first area comprises inner tracks of the magnetic medium. The method further comprises receiving a read request for the first address; and selectively responding with data from the second address. The method further comprises caching frequently accessed data in the second area. The method further comprises maintaining an index of addresses currently cached within the second area.

In further features, the method further comprises storing the index within a subarea of the second area. The method further comprises caching data corresponding to a first set of addresses in the second area. The addresses of the first set of addresses are located in the first area. The method further comprises receiving the first set of addresses from a host. The method further comprises storing the data corresponding to the first set of addresses sequentially in a predetermined order in the second area, the predetermined order being based upon an order of expected retrieval.

In still other features, the method further comprises caching data corresponding to a second set of addresses in the second area prior to shutting down. The addresses of the second set of addresses are located in the first area. The method further comprises receiving the second set of addresses from a host. The method further comprises storing the data corresponding to the second set of addresses sequentially in a predetermined order in the second area, the predetermined order being based upon an order of expected retrieval.

In other features, the method further comprises suspending caching data in the NVS memory when a usable lifetime of the NVS memory has expired. The method further comprises determining when the usable lifetime of the NVS memory has expired. The method further comprises monitoring cumulative usage of the NVS memory to determine when the usable lifetime has expired. The method further comprises beginning caching data in the second area when a usable lifetime of the NVS memory has expired.

A computer program stored for use by a processor for operating a hybrid hard disk drive (HDD) controller comprises selectively caching data in nonvolatile semiconductor (NVS) memory; defining non-overlapping first and second areas of the magnetic medium; receiving at the hybrid HDD controller a write request containing first data for a first address in the first area; and selectively caching the first data at a second address in the second area before storing the first data at the first address.

In other features, the second area comprises outer tracks of the magnetic medium and the first area comprises inner tracks of the magnetic medium. The computer program further comprises receiving a read request for the first address; and selectively responding with data from the second address. The computer program further comprises caching frequently accessed data in the second area. The computer program further comprises maintaining an index of addresses currently cached within the second area.

In further features, the computer program further comprises storing the index within a subarea of the second area. The computer program further comprises caching data corresponding to a first set of addresses in the second area. The addresses of the first set of addresses are located in the first area. The computer program further comprises receiving the first set of addresses from a host. The computer program further comprises storing the data corresponding to the first set of addresses sequentially in a predetermined order in the second area, the predetermined order being based upon an order of expected retrieval.

In still other features, the computer program further comprises caching data corresponding to a second set of addresses in the second area prior to shutting down. The addresses of the second set of addresses are located in the first area. The computer program further comprises receiving the second set of addresses from a host. The computer program further comprises storing the data corresponding to the second set of addresses sequentially in a predetermined order in the second area, the predetermined order being based upon an order of expected retrieval.

In other features, the computer program further comprises suspending caching data in the NVS memory when a usable lifetime of the NVS memory has expired. The computer program further comprises determining when the usable lifetime of the NVS memory has expired. The computer program further comprises monitoring cumulative usage of the NVS memory to determine when the usable lifetime has expired. The computer program further comprises beginning caching data in the second area when a usable lifetime of the NVS memory has expired.

A hybrid hard disk drive (HDD) controller comprises channel means for reading and writing data to a magnetic medium; nonvolatile semiconductor (NVS) storage means for storing data; and control means for selectively caching data in the NVS storage means, for defining non-overlapping first and second areas of the magnetic medium, for receiving a write request containing first data for a first address in the first area, and for selectively caching the first data at a second address in the second area before storing the first data at the first address.

In other features, the second area comprises outer tracks of the magnetic medium and the first area comprises inner tracks of the magnetic medium. The control means receives a read request for the first address and selectively responds with data from the second address. The control means caches frequently accessed data in the second area. The control means maintains an index of addresses currently cached within the second area. The control means stores the index within a subarea of the second area.

In further features, the control means caches data corresponding to a first set of addresses in the second area. The addresses of the first set of addresses are located in the first area. The control means receives the first set of addresses from a host. The control means stores the data corresponding to the first set of addresses sequentially in a predetermined order in the second area, the predetermined order being based upon an order of expected retrieval.

In still other features, the control means caches data corresponding to a second set of addresses in the second area prior to shutting down. The addresses of the second set of addresses are located in the first area. The control means receives the second set of addresses from a host. The control means stores the data corresponding to the second set of addresses sequentially in a predetermined order in the second area, the predetermined order being based upon an order of expected retrieval. The control means suspends caching data in the NVS storage means when a usable lifetime of the NVS storage means has expired.

In other features, the hybrid HDD controller further comprises life monitor means for determining when the usable lifetime of the NVS storage means has expired. The life monitor means monitors cumulative usage of the NVS storage means to determine when the usable lifetime has expired. The control means begins caching data in the second area when a usable lifetime of the NVS storage means has expired. A hybrid HDD comprises the hybrid HDD controller and a hard disk assembly including the magnetic medium.

A hard disk drive (HDD) controller comprises a channel module that reads and writes data to a magnetic medium; and a control module that defines non-overlapping first and second areas of the magnetic medium and that caches data corresponding to addresses within the second area within the first area.

In other features, the second area comprises outer tracks of the magnetic medium and the first area comprises inner tracks of the magnetic medium. The control module maintains an index of addresses corresponding to data cached in the second area. The control module stores the index within a subarea of the second area. The control module caches frequently accessed data in the second area. The control module caches data corresponding to a first set of addresses in the second area.

In further features, the addresses of the first set of addresses are located in the first area. The control module receives the first set of addresses from a host. The control module stores the data corresponding to the first set of addresses sequentially in a predetermined order in the second area, the predetermined order being based upon an order of expected retrieval. The control module caches data corresponding to a second set of addresses in the second area prior to shutting down. The addresses of the second set of addresses are located in the first area.

In still other features, the control module receives the second set of addresses from a host. The control module stores the data corresponding to the second set of addresses sequentially in a predetermined order in the second area, the predetermined order being based upon an order of expected retrieval. The control module caches data in the second area prior to writing the data to the first area. An HDD comprises the HDD controller and a hard disk assembly including the magnetic medium.

A method for operating a hard disk drive (HDD) controller comprises reading and writing data to a magnetic medium; defining non-overlapping first and second areas of the magnetic medium; and caching data corresponding to addresses within the second area within the first area.

In other features, the second area comprises outer tracks of the magnetic medium and the first area comprises inner tracks of the magnetic medium. The method further comprises maintaining an index of addresses corresponding to data cached in the second area. The method further comprises storing the index within a subarea of the second area. The method further comprises caching frequently accessed data in the second area. The method further comprises caching data corresponding to a first set of addresses in the second area.

In further features, the addresses of the first set of addresses are located in the first area. The method further comprises receiving the first set of addresses from a host. The method further comprises storing the data corresponding to the first set of addresses sequentially in a predetermined order in the second area, the predetermined order being based upon an order of expected retrieval. The method further comprises caching data corresponding to a second set of addresses in the second area prior to shutting down.

In still other features, the addresses of the second set of addresses are located in the first area. The method further comprises receiving the second set of addresses from a host. The method further comprises storing the data corresponding to the second set of addresses sequentially in a predetermined order in the second area, the predetermined order being based upon an order of expected retrieval. The method further comprises caching data in the second area prior to writing the data to the first area.

A computer program stored for use by a processor for operating a hard disk drive (HDD) controller comprises reading and writing data to a magnetic medium; defining non-overlapping first and second areas of the magnetic medium; and caching data corresponding to addresses within the second area within the first area.

In other features, the second area comprises outer tracks of the magnetic medium and the first area comprises inner tracks of the magnetic medium. The computer program further comprises maintaining an index of addresses corresponding to data cached in the second area. The computer program further comprises storing the index within a subarea of the second area. The computer program further comprises caching frequently accessed data in the second area. The computer program further comprises caching data corresponding to a first set of addresses in the second area.

In further features, the addresses of the first set of addresses are located in the first area. The computer program further comprises receiving the first set of addresses from a host. The computer program further comprises storing the data corresponding to the first set of addresses sequentially in a predetermined order in the second area, the predetermined order being based upon an order of expected retrieval. The computer program further comprises caching data corresponding to a second set of addresses in the second area prior to shutting down.

In still other features, the addresses of the second set of addresses are located in the first area. The computer program further comprises receiving the second set of addresses from a host. The computer program further comprises storing the data corresponding to the second set of addresses sequentially in a predetermined order in the second area, the predetermined order being based upon an order of expected retrieval. The computer program further comprises caching data in the second area prior to writing the data to the first area.

A hard disk drive (HDD) controller comprises channel means for reading and writing data to a magnetic medium; and control means for defining non-overlapping first and second areas of the magnetic medium and for caching data corresponding to addresses within the second area within the first area.

In other features, the second area comprises outer tracks of the magnetic medium and the first area comprises inner tracks of the magnetic medium. The control means maintains an index of addresses corresponding to data cached in the second area. The control means stores the index within a subarea of the second area. The control means caches frequently accessed data in the second area. The control means caches data corresponding to a first set of addresses in the second area.

In further features, the addresses of the first set of addresses are located in the first area. The control means receives the first set of addresses from a host. The control means stores the data corresponding to the first set of addresses sequentially in a predetermined order in the second area, the predetermined order being based upon an order of expected retrieval. The control means caches data corresponding to a second set of addresses in the second area prior to shutting down.

In still other features, the addresses of the second set of addresses are located in the first area. The control means receives the second set of addresses from a host. The control means stores the data corresponding to the second set of addresses sequentially in a predetermined order in the second area, the predetermined order being based upon an order of expected retrieval. The control means caches data in the second area prior to writing the data to the first area. An HDD comprises the HDD controller and a hard disk assembly including the magnetic medium.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 3:
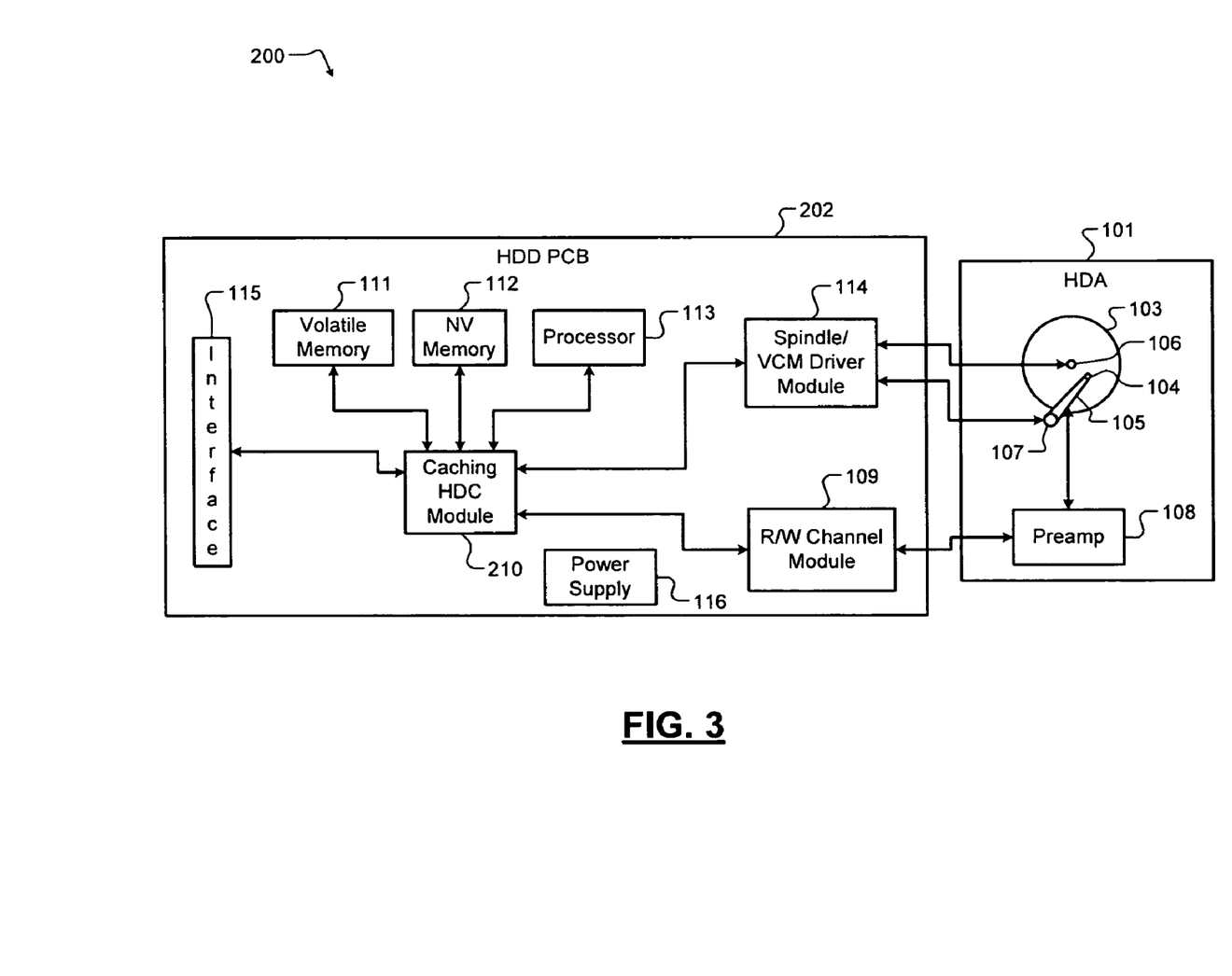
FIG. 3 is a functional block diagram of an exemplary HDD according to the principles of the present disclosure.
Figure 4:
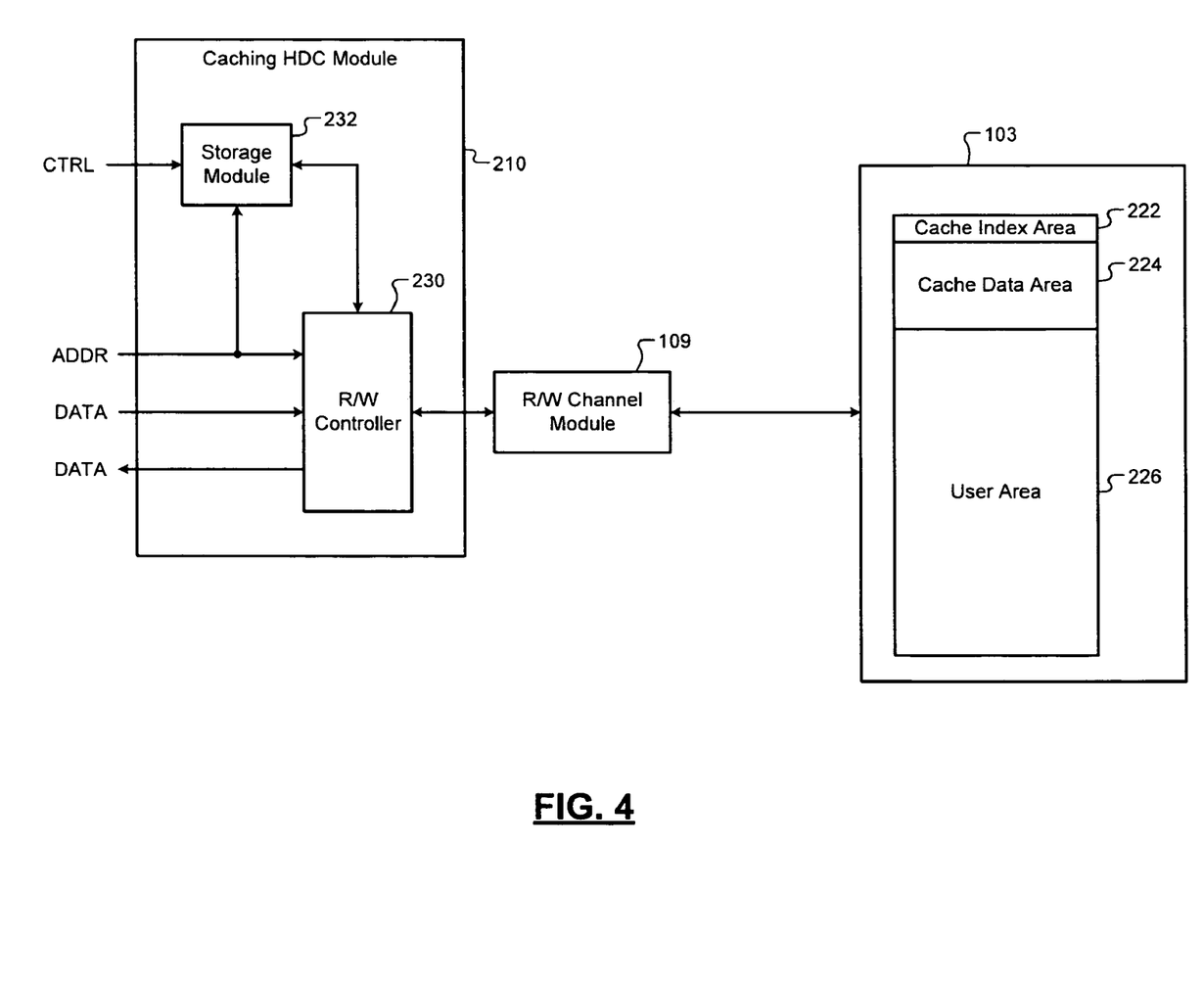
FIG. 4 is a functional block diagram of an exemplary caching system according to the principles of the present disclosure.
Figure 5:
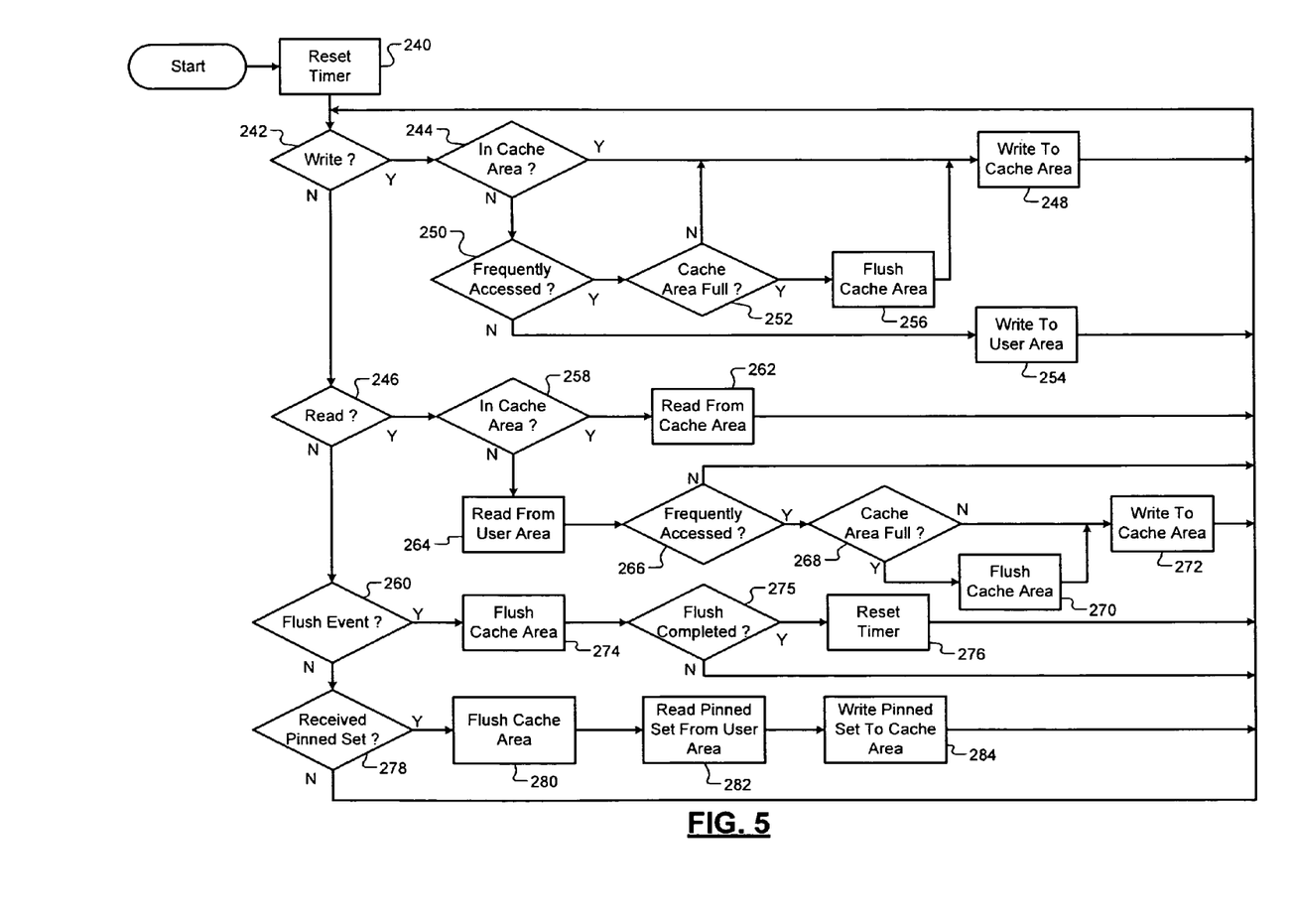
FIG. 5 is a flowchart depicting exemplary operation of the caching HDC module.

FIGS. 3-4 of the present disclosure illustrate non-hybrid HDDs that achieve various benefits of hybrid HDDs. The non-hybrid HDDs may achieve these benefits with only firmware changes to a conventional non-hybrid HDD. Data stored in outer regions of hard drive platters have high transfer rates for sequential accesses. These regions of the magnetic storage in the non-hybrid HDD can be used as cache for data in other regions of the hard drive platters. Exemplary operation of such an HDD is shown in FIG. 5.

Figure 6:
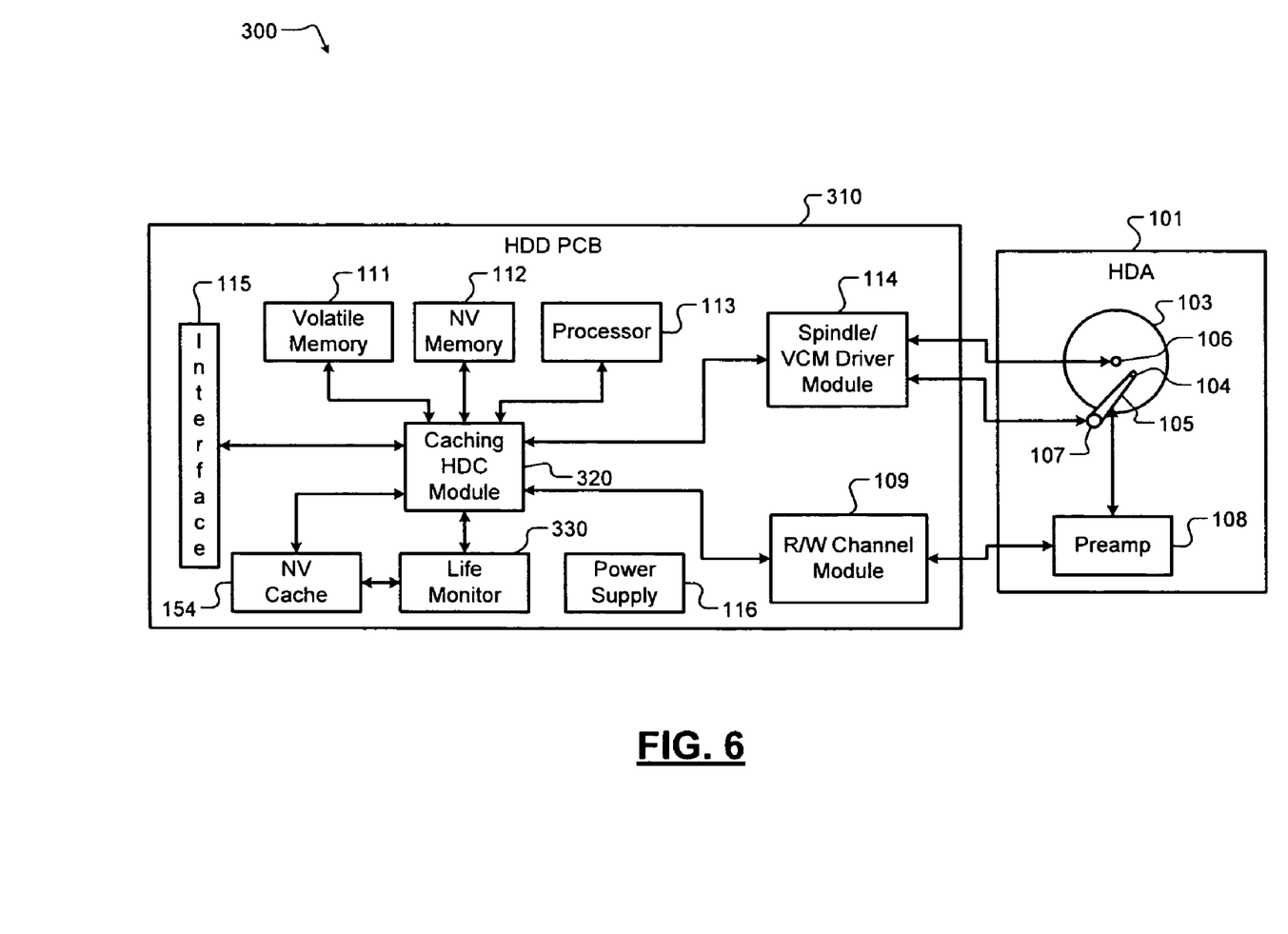
FIG. 6 is a functional block diagram of a hybrid HDD according to the principles of the present disclosure.

The teachings of the present disclosure can also be used with hybrid HDDs, as shown in FIG. 6. Once the usable lifetime of nonvolatile cache in a hybrid HDD has expired, data can be cached in magnetic storage to retain some various advantages over a conventional non-hybrid HDD.

Referring back to FIG. 3, a functional block diagram of an exemplary HDD 200 is presented. The HDD 200 includes an HDD PCB 202 and the HDA 101. The HDD PCB 202 includes volatile memory 111, nonvolatile memory 112, the read channel 109, the processor 113, the spindle/VCM driver module 114, the I/O interface 115, the power supply 116, and a caching HDC module 210.

Magnetic storage currently has higher data transfer rates than nonvolatile semiconductor memory, while nonvolatile semiconductor memory has faster access times. Access time in magnetic storage is governed by seek and rotational latencies. The magnetic medium 103 of the HDD 200, which may include a stack of platters, may be arranged in concentric circles called tracks. Each track may be subdivided into sectors.

In order to access data from a sector, the actuator arm 105 seeks to the correct track of the magnetic medium 103 and the magnetic medium 103 rotates to position the desired sector beneath the read/write device 104. Seek time is therefore minimized if accesses are made from adjacent tracks. Outer tracks of the magnetic medium 103 are physically longer and therefore can store more data than inner tracks. Because the magnetic medium 103 spins at a constant angular velocity, data is accessed at a higher rate from outer tracks than from inner tracks. Data of interest can be quickly accessed by storing it in the outermost tracks of the magnetic medium 103.

Magnetic storage media also features similar data transfer rates for both reading and writing. For purposes of example only, a 5,400 rpm HDD may have a data transfer rate of almost 40 MB/s. Faster drives, such as a 15,000 rpm HDD, may have a data transfer rate of nearly 100 MB/s. Nonvolatile semiconductor memory, such as flash, is significantly slower at writing than reading. Further, once flash has been written, it must be erased before writing again, which may involve significant latency. For purposes of example only, a NOR flash technology that achieves a read rate of 100 MB/s has a write speed of only 0.5 MB/s and requires 0.9 seconds for an erase operation.

The caching HDC module 210 may cache data in the outermost tracks of the magnetic medium 103 to approximate function of the hybrid HDD 150 of FIG. 2 in caching data. In various implementations, the caching HDC module 210 may be implemented as the HDC module 110 of FIG. 1 with revised operating instructions. The revised operating instructions may take the form of updated firmware stored in nonvolatile memory 112 and executed by the processor 113.

The caching HDC module 210 may store data of interest in a predetermined caching area of the magnetic medium 103. For example only, the caching area may include a fixed amount of storage in the outermost tracks. For an 80 GB hard drive, 256 MB of caching capacity results in only a 0.3% loss in storage capacity. The caching HDC module 210 maintains an index identifying which logical block addresses (LBAs) are stored in the caching area. The caching HDC module 210 may store the index within the caching area itself. In various implementations, the caching area can be increased to provide for index storage without losing caching capacity.

The caching HDC module 210 may store write data in the caching area and then later transfer the data to its permanent location within the magnetic medium 103. The caching HDC module 210 may write data from the caching area to permanent locations in the magnetic medium 103 at various times. These times may include when the HDA 101 is idle, before powering down the HDD 200, and at periodic intervals.

An operating system running on the host may instruct the caching HDC module 210, via the I/O interface 115, to cache certain data that will be accessed frequently. When shutting down or hibernating, the operating system may instruct the caching HDC module 210 to cache data corresponding to a specified set of addresses. This specified set of addresses may be called a pinned set.

The caching HDC module 210 may cache the pinned set in a static portion of the caching area. In response to a flush command, data in the corresponding to the pinned set may be written from the caching area to permanent locations in the magnetic medium 103. Other data may be stored in a dynamic portion of the caching area. In response to a flush command, this other data may be written to permanent locations in the magnetic medium 103 and removed from the dynamic portion of the caching area.

Referring now to FIG. 4, a functional block diagram of an exemplary caching system is presented. The magnetic medium 103 includes an optional cache index area 222, a cache data area 224, and a user area 226. The cache index area 222 may include a list of addresses of the data that is being cached in the cache data area 224.

The caching HDC module 210 includes a read/write (RAN) controller 230 and a storage module 232. In various implementations, the storage module 232 may be implemented by volatile memory 111 and/or nonvolatile memory 112 of FIG. 3. The storage module 232 may contain some or all of the addresses being cached in the cache data area 224. The storage module 232 can thus operate as a cache of the cache index area 222. Alternatively, the magnetic medium 103 may not include the cache index area 222, and the storage module 232 contains all addresses being cached in the cache data area 224.

The R/W controller 230 receives address and data information, such as from the I/O interface 115, and provides data information. When an address is received, it may be compared to addresses within the storage module 232. If the address is currently being cached, the data can be accessed from the cache data area. Otherwise, the data is accessed from the user area 226.

The storage module 232 may receive control information indicating which addresses form the pinned set. Blocks listed in the pinned set may be copied from the user area 226 into the cache data area 224. Copying may occur when the pinned set is specified, or upon a power down command. The storage module 232 may also receive a list of frequently accessed addresses. The R/W controller 230 can cache data corresponding to the frequently accessed addresses in the cache data area 224. The caching HDC module 210 may also determine and cache addresses that are the subject of frequent accesses.

At various times, data is flushed from the cache data area 224 to the user area 226. These times may include at periodic intervals, upon reaching the capacity of the cache data area 224, and before power down. During a flush, blocks of data may be stored in the storage module 232 between being read from the cache data area 224 and being written to the user area 226.

Referring now to FIG. 5, a flowchart depicts exemplary caching operation of the caching HDC module 210. Control begins in step 240, where a timer is reset. This timer may be used to periodically flush the contents of the cache data area. Flushing the cache data area involves writing data from the cache data area to the user area, and may include clearing the cache data area.

Control continues in step 242, when a control determines whether a write has been requested. If so, control transfers to step 244; otherwise, control transfers to step 246. In step 244, control determines whether the target address of the write is currently cached in the cache data area. If so, control transfers to step 248; otherwise, control transfers to step 250.

In step 248, write data is written to the location in the cache data area where the target address of the write is being cached and control returns to step 242. In step 250, control may determine whether the target address is frequently accessed. If the target address is determined to be frequently accessed, control transfers to step 252; otherwise, control transfers to step 254. In step 254, the write data is written to the target address in the user area, and control returns to step 242.

In step 252, control determines whether the cache data area is full. If the cache data area is full, control transfers to step 256; otherwise, control transfers to step 248. In step 256, the cache data area is flushed. The entire cache data area or only portions of the cache data area may be flushed. Control may also remove addresses from the index of cached addresses to allow for new data to be cached. Control then continues to step 248, where the write data is written to the cache data area and control returns to step 242.

In step 246, control determines whether a read request has been made. If so, control transfers to step 258; otherwise, control transfers to step 260. In step 258, control determines whether the target address of the read is currently cached in the cache data area. If so, control transfers to step 262; otherwise, control transfers to step 264. In step 262, control reads the requested data from the cache data area, and control returns to step 242. In step 264, control reads the data from the user area and continues in step 266.

In step 266, if the target address of the read is frequently accessed, control transfers to step 268; otherwise, control returns to step 242. Once the requested data has been read from the user area, it can be rewritten to the cache data area and thereafter be accessed more quickly. In step 268, control determines whether the cache data area is full. If so, control transfers to step 270; otherwise, control transfers to step 272.

In step 270, all or part of the cache data area is flushed to the user area. Control may also free a portion of the cache data area to allow for the data from the read request to be cached in the cache data area. Control continues in step 272. In step 272, the data read from the user area in response to the read request is written to the cache data area, and control returns to step 242.

In step 260, control determines whether a flush event has occurred. For example, expiration of the timer may constitute a flush event. Flush events may also include shutdown commands and indications that the caching HDC module 210 will be idle for at least some minimum period of time. When a flush event occurs, control transfers to step 274, where the cache data area is flushed.

Control continues in step 275, where control determines whether the flush was completed. In various implementations, if the flush event is an idle indicator, the process of flushing the cache data area may continue until the idle indication is no longer present. As a result, the entire cache data area may not be entirely flushed at one time. If the flush was completed, control transfers to step 276; otherwise, control returns to step 242. In step 276, control resets the timer and then returns to step 242.

Returning to step 260, if a flush event has not occurred, control transfers to step 278. In step 278, control determines whether a pinned set has been received. If so, control transfers to step 280; otherwise, control returns to step 242. Alternatively, if a pinned set has not been received, control may check for other received commands and/or take other action.

In step 280, control flushes the cache data area. Control may also remove a number of addresses from the index of addresses cached in order to make room for data from the pinned set. Control continues in step 282, where control reads data corresponding to the pinned set from the user area. Control continues in step 284, where data from the pinned set is written to the cache data area. Control may lock the addresses of the pinned set in the index of addresses cached so that addresses of the pinned set will not be displaced by other addresses, such as those of frequently accessed data. Control then returns to step 242.

Referring now to FIG. 6, a functional block diagram of a hybrid HDD 300 is presented. The hybrid HDD 300 includes the HDA 101 and an HDD PCB 310. The HDD PCB 310 includes volatile memory 111, nonvolatile memory 112, the read channel 109, the processor 113, the spindle/VCM driver module 114, the I/O interface 115, the power supply 116, the nonvolatile cache 154, a caching HDC module 320, and an optional life monitor module 330.

The life monitor module 330 estimates whether the nonvolatile cache 154 has reached the end of its usable lifetime. Alternatively, usable lifetime of the nonvolatile cache 154 may be estimated by software running on the host device. The life monitor module 330 monitors memory operations performed on the nonvolatile cache 154, such as program operations and erase operations. Reliability of storage cells within the nonvolatile cache 154 may decrease based on the number of erase operations performed on the storage cell.

The life monitor module 330 may keep track of erase operations performed on each storage cell, or may track the number of erase operations performed on a group of storage cells. For example, groups of storage cells called blocks may be erased simultaneously. The life monitor module 330 may then track the number of erase operations performed per block.

The caching HDC module 320 may include a write-balancing scheme for writing to the nonvolatile cache 154. The write-balancing scheme distributes writes across the nonvolatile cache 154 to maintain an approximately uniform number of writes for each block. In such implementations, the life monitor module 330 may track only a single average number of erase operations for the nonvolatile cache 154.

The semiconductor memory used in the nonvolatile cache 154 will have an associated expected lifetime measured in memory operations. For example, the nonvolatile cache 154 may be rated for 1,000,000 erase cycles. Once the life monitor module 330 determines that this number of memory operations has been reached, the nonvolatile cache 154 may be considered to have reached the end of its usable lifetime.

In various other implementations, the life monitor module 330 may perform tests on the nonvolatile cache 154 to determine whether storage cells have degraded. The life monitor module 330 may also establish test storage cells within the nonvolatile cache 154. Known values can be stored into the test storage cells, and measurements of the test storage cells indicate the condition of the remaining storage cells in the nonvolatile cache 154.

Once the life monitor module 330 determines that the nonvolatile cache 154 has reached the end of its usable lifetime, the nonvolatile cache 154 may be disabled. The caching HDC module 320 may then cache data in the magnetic medium 103. The deactivation of the nonvolatile cache 154 may be seamless, with cached data moved from the nonvolatile cache 154 into a cache data area of the magnetic medium 103.

The caching HDC module 320 may divide the magnetic medium 103 into a cache data area and a user area. This may be done when the hybrid HDD 300 is first turned on or as the end of the usable lifetime of the nonvolatile cache 154 approaches. Data located within the newly-defined cache data area can be moved to the user area. If there is not enough free space within the user area, an error can be signaled to the host. Alternatively, the caching HDC module 320 may enforce a requirement that an amount of free space remain on the magnetic medium 103 that is equal to the cache data area.

Once the cache data area and user area have been defined, the caching HDC module 320 can begin caching data in the cache data area. This may be performed to provide the same functionality as when data was being cached in the nonvolatile cache 154.

Figure 7A:
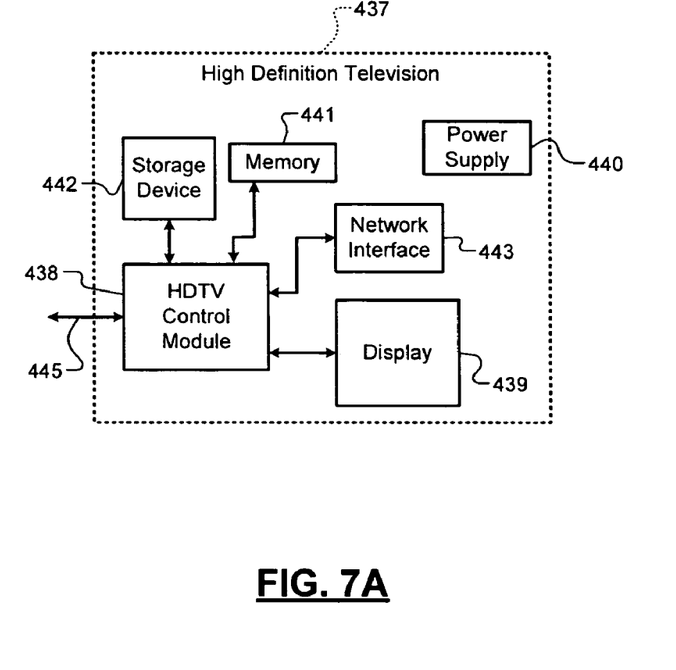
FIG. 7A is a functional block diagram of a high definition television.

Referring now to FIGS. 7A-7D, various exemplary implementations incorporating the teachings of the present disclosure are shown. Referring now to FIG. 7A, the teachings of the disclosure can be implemented in a storage device 442 of a high definition television (HDTV) 437. The HDTV 437 includes a HDTV control module 438, a display 439, a power supply 440, memory 441, the storage device 442, a network interface 443, and an external interface 445. If the network interface 443 includes a wireless local area network interface, an antenna (not shown) may be included.

The HDTV 437 can receive input signals from the network interface 443 and/or the external interface 445, which can send and receive data via cable, broadband Internet, and/or satellite. The HDTV control module 438 may process the input signals, including encoding, decoding, filtering, and/or formatting, and generate output signals. The output signals may be communicated to one or more of the display 439, memory 441, the storage device 442, the network interface 443, and the external interface 445.

Memory 441 may include random access memory (RAM) and/or nonvolatile memory such as flash memory, phase change memory, or multi-state memory, in which each memory cell has more than two states. The storage device 442 may include an optical storage drive, such as a DVD drive, and/or a hard disk drive (HDD). The HDTV control module 438 communicates externally via the network interface 443 and/or the external interface 445. The power supply 440 provides power to the components of the HDTV 437.

Figure 7B:
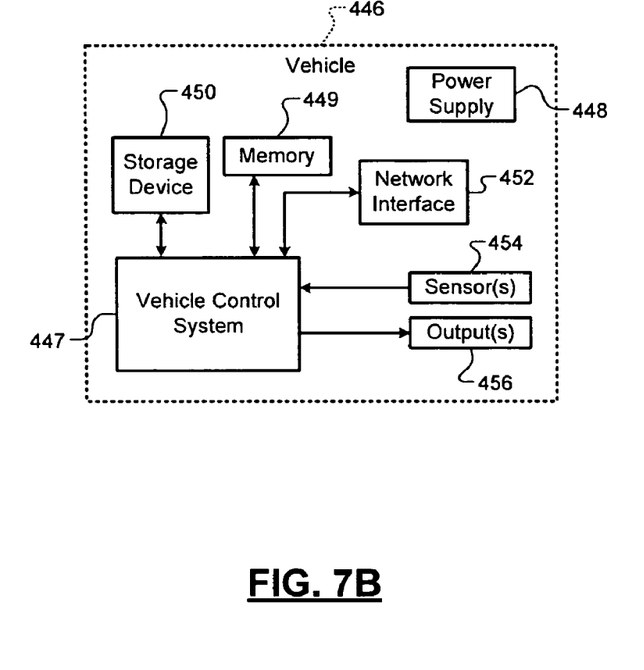
FIG. 7B is a functional block diagram of a vehicle control system.

Referring now to FIG. 7B, the teachings of the disclosure may be implemented in a storage device 450 of a vehicle 446. The vehicle 446 may include a vehicle control system 447, a power supply 448, memory 449, the storage device 450, and a network interface 452. If the network interface 452 includes a wireless local area network interface, an antenna (not shown) may be included. The vehicle control system 447 may be a powertrain control system, a body control system, an entertainment control system, an anti-lock braking system (ABS), a navigation system, a telematics system, a lane departure system, an adaptive cruise control system, etc.

The vehicle control system 447 may communicate with one or more sensors 454 and generate one or more output signals 456. The sensors 454 may include temperature sensors, acceleration sensors, pressure sensors, rotational sensors, airflow sensors, etc. The output signals 456 may control engine operating parameters, transmission operating parameters, suspension parameters, etc.

The power supply 448 provides power to the components of the vehicle 446. The vehicle control system 447 may store data in memory 449 and/or the storage device 450. Memory 449 may include random access memory (RAM) and/or nonvolatile memory such as flash memory, phase change memory, or multi-state memory, in which each memory cell has more than two states. The storage device 450 may include an optical storage drive, such as a DVD drive, and/or a hard disk drive (HDD). The vehicle control system 447 may communicate externally using the network interface 452.

Figure 7C:
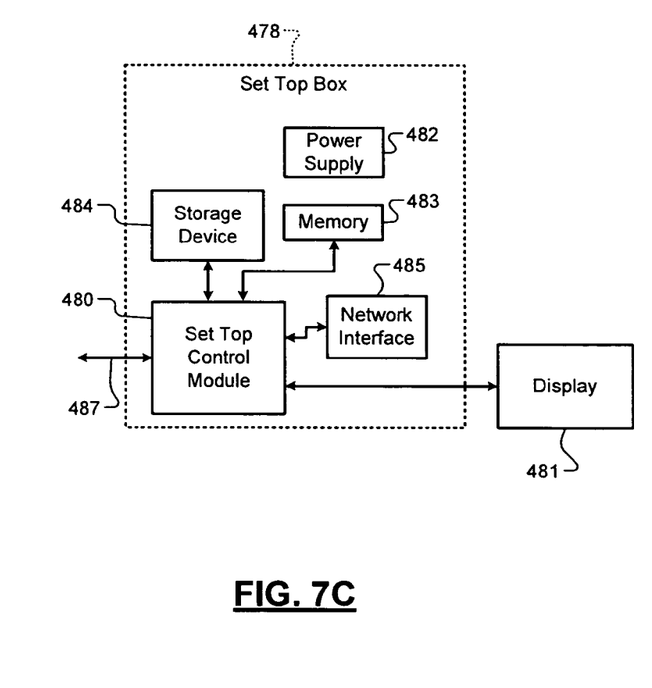
FIG. 7C is a functional block diagram of a set top box.

Referring now to FIG. 7C, the teachings of the disclosure can be implemented in a storage device 484 of a set top box 478. The set top box 478 includes a set top control module 480, a display 481, a power supply 482, memory 483, the storage device 484, and a network interface 485. If the network interface 485 includes a wireless local area network interface, an antenna (not shown) may be included.

The set top control module 480 may receive input signals from the network interface 485 and an external interface 487, which can send and receive data via cable, broadband Internet, and/or satellite. The set top control module 480 may process signals, including encoding, decoding, filtering, and/or formatting, and generate output signals. The output signals may include audio and/or video signals in standard and/or high definition formats. The output signals may be communicated to the network interface 485 and/or to the display 481. The display 481 may include a television, a projector, and/or a monitor.

The power supply 482 provides power to the components of the set top box 478. Memory 483 may include random access memory (RAM) and/or nonvolatile memory such as flash memory, phase change memory, or multi-state memory, in which each memory cell has more than two states. The storage device 484 may include an optical storage drive, such as a DVD drive, and/or a hard disk drive (HDD).

Figure 7D:
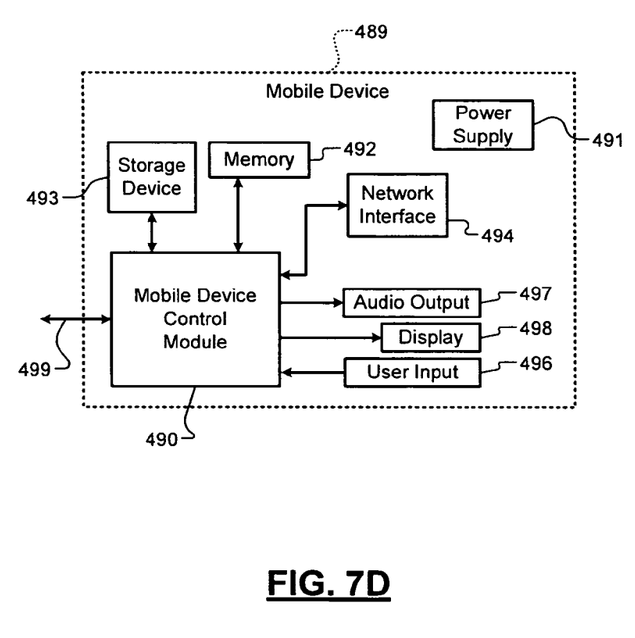
FIG. 7D is a functional block diagram of a mobile device.

Referring now to FIG. 7D, the teachings of the disclosure can be implemented in a storage device 493 of a mobile device 489. The mobile device 489 may include a mobile device control module 490, a power supply 491, memory 492, the storage device 493, a network interface 494, and an external interface 499. If the network interface 494 includes a wireless local area network interface, an antenna (not shown) may be included.

The mobile device control module 490 may receive input signals from the network interface 494 and/or the external interface 499. The external interface 499 may include USB, infrared, and/or Ethernet. The input signals may include compressed audio and/or video, and may be compliant with the MP3 format. Additionally, the mobile device control module 490 may receive input from a user input 496 such as a keypad, touchpad, or individual buttons. The mobile device control module 490 may process input signals, including encoding, decoding, filtering, and/or formatting, and generate output signals.

The mobile device control module 490 may output audio signals to an audio output 497 and video signals to a display 498. The audio output 497 may include a speaker and/or an output jack. The display 498 may present a graphical user interface, which may include menus, icons, etc. The power supply 491 provides power to the components of the mobile device 489.

Memory 492 may include random access memory (RAM) and/or nonvolatile memory such as flash memory, phase change memory, or multi-state memory, in which each memory cell has more than two states. The storage device 493 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A hard disk drive (HDD) controller, comprising:
    a channel module configured to read and write data to a magnetic medium; and
    a control module configured to
        define a first area and a second area of the magnetic medium, wherein the first area does not overlap the second area,
        receive a write request containing first data for a first address in the first area,
        using the channel module, cache the first data at a second address in the second area prior to storing the first data at the first address,
        using the channel module, cache data corresponding to a first set of addresses in the second area, wherein the first set of addresses correspond to locations in the first area, and
        using the channel module, store the data corresponding to the first set of addresses sequentially in a predetermined order in the second area, the predetermined order being based on an order of expected retrieval.

2. The HDD controller of claim 1, wherein the second area comprises outer tracks of the magnetic medium, and the first area comprises inner tracks of the magnetic medium.

3. The HDD controller of claim 1, wherein the control module receives a read request for the first address and selectively responds with data from the second address.

4. The HDD controller of claim 1, wherein the control module caches data that is frequently accessed in the second area.

5. The HDD controller of claim 1, wherein the control module maintains an index of addresses currently cached within the second area.

6. The HDD controller of claim 5, wherein the control module stores the index within a subarea of the second area.

7. The HDD controller of claim 1, wherein the control module receives the first set of addresses from a host.

8. The HDD controller of claim 1, wherein the control module caches data corresponding to a second set of addresses in the second area prior to shutting down, wherein the second set of addresses are located in the first area.

9. The HDD controller of claim 8, wherein the control module receives the second set of addresses from a host.

10. The HDD controller of claim 8, wherein the control module stores the data corresponding to the second set of addresses sequentially in a predetermined order in the second area, the predetermined order being based on an order of expected retrieval.

11. An HDD, comprising:
the HDD controller of claim 1; and
a hard disk assembly including the magnetic medium.

12. A method for operating a hard disk drive (HDD) controller, the method comprising:
defining a first area and a second area of a magnetic medium, wherein the first area does not overlap the second area;
receiving, at the HDD controller, a write request containing first data for a first address in the first area;
caching the first data at a second address in the second area prior to storing the first data at the first address;
caching data corresponding to a first set of addresses in the second area, wherein the first set of addresses correspond to locations in the first area; and
storing the data corresponding to the first set of addresses sequentially in a predetermined order in the second area, the predetermined order being based on an order of expected retrieval.

13. The method of claim 12, wherein the second area comprises outer tracks of the magnetic medium, and the first area comprises inner tracks of the magnetic medium.

14. The method of claim 12, further comprising:
receiving a read request for the first address; and
selectively responding with data from the second address.

15. The method of claim 12, further comprising caching data that is frequently accessed in the second area.

16. The method of claim 12, further comprising maintaining an index of addresses currently cached within the second area.

17. The method of claim 16, further comprising storing the index within a subarea of the second area.

18. The method of claim 12, further comprising receiving the first set of addresses from a host.

19. The method of claim 12, further comprising caching data corresponding to a second set of addresses in the second area prior to shutting down, wherein the second set of addresses are located in the first area.

20. The method of claim 19, further comprising receiving the second set of addresses from a host.

21. The method of claim 19, further comprising storing the data corresponding to the second set of addresses sequentially in a predetermined order in the second area, the predetermined order being based on an order of expected retrieval.

22. A hybrid hard disk drive (HDD) controller, comprising:
a channel module configured to read and write data to a magnetic medium;
nonvolatile semiconductor (NVS) memory; and
a control module configured to
selectively cache data in the NVS memory,
define a first area and a second area of the magnetic medium, wherein the first area does not overlap the second area,
receive a write request containing first data for a first address in the first area,
using the channel module, selectively cache the first data at a second address in the second area prior to storing the first data at the first address,
using the channel module, cache data corresponding to a first set of addresses in the second area, wherein the addresses of the first set of addresses correspond to locations in the first area, and
using the channel module, store the data corresponding to the first set of addresses sequentially in a predetermined order in the second area, the predetermined order being based on an order of expected retrieval.

23. The hybrid HDD controller of claim 22, wherein the second area comprises outer tracks of the magnetic medium, and the first area comprises inner tracks of the magnetic medium.

24. The hybrid HDD controller of claim 22, wherein the control module receives a read request for the first address and selectively responds with data from the second address.

25. The hybrid HDD controller of claim 22, wherein the control module caches data that is frequently accessed in the second area.

26. The hybrid HDD controller of claim 22, wherein the control module maintains an index of addresses currently cached within the second area.

27. The hybrid HDD controller of claim 26, wherein the control module stores the index within a subarea of the second area.

28. The hybrid HDD controller of claim 22, wherein the control module receives the first set of addresses from a host.

29. The hybrid HDD controller of claim 22, wherein the control module caches data corresponding to a second set of addresses in the second area prior to shutting down, wherein the addresses of the second set of addresses are located in the first area.

30. The hybrid HDD controller of claim 29, wherein the control module receives the second set of addresses from a host.

31. The hybrid HDD controller of claim 29, wherein the control module stores the data corresponding to the second set of addresses sequentially in a predetermined order in the second area, the predetermined order being based on an order of expected retrieval.

32. The hybrid HDD controller of claim 22, wherein the control module suspends caching data in the NVS memory when a usable lifetime of the NVS memory has expired.

33. The hybrid HDD controller of claim 32, further comprising a life monitor module configured to determine when the usable lifetime of the NVS memory has expired.

34. The hybrid HDD controller of claim 33, wherein the life monitor module monitors cumulative usage of the NVS memory to determine when the usable lifetime has expired.

35. The hybrid HDD controller of claim 22, wherein the control module begins caching data in the second area when a usable lifetime of the NVS memory has expired.

36. A hybrid HDD, comprising:
the hybrid HDD controller of claim 22; and
a hard disk assembly including the magnetic medium.

37. A method for operating a hybrid hard disk drive (HDD) controller, the method comprising:
selectively caching data in nonvolatile semiconductor (NVS) memory;
defining a first area and a second area of a magnetic medium, wherein the first area does not overlap the second area;
receiving, at the hybrid HDD controller, a write request containing first data for a first address in the first area;
selectively caching the first data at a second address in the second area prior to storing the first data at the first address;
caching data corresponding to a first set of addresses in the second area, wherein the addresses of the first set of addresses correspond to locations in the first area; and
storing the data corresponding to the first set of addresses sequentially in a predetermined order in the second area, the predetermined order being based on an order of expected retrieval.

38. The method of claim 37, wherein the second area comprises outer tracks of the magnetic medium, and the first area comprises inner tracks of the magnetic medium.

39. The method of claim 37, further comprising:
receiving a read request for the first address; and
selectively responding with data from the second address.

40. The method of claim 37, further comprising caching data that is frequently accessed in the second area.

41. The method of claim 37, further comprising maintaining an index of addresses currently cached within the second area.

42. The method of claim 41, further comprising storing the index within a subarea of the second area.

43. The method of claim 37, further comprising receiving the first set of addresses from a host.

44. The method of claim 37, further comprising caching data corresponding to a second set of addresses in the second area prior to shutting down, wherein the addresses of the second set of addresses are located in the first area.

45. The method of claim 44, further comprising receiving the second set of addresses from a host.

46. The method of claim 44, further comprising storing the data corresponding to the second set of addresses sequentially in a predetermined order in the second area, the predetermined order being based on an order of expected retrieval.

47. The method of claim 37, further comprising suspending caching data in the NVS memory when a usable lifetime of the NVS memory has expired.

48. The method of claim 47, further comprising determining when the usable lifetime of the NVS memory has expired.

49. The method of claim 48, further comprising monitoring cumulative usage of the NVS memory to determine when the usable lifetime has expired.

50. The method of claim 37, further comprising beginning caching data in the second area when a usable lifetime of the NVS memory has expired.

51. A hard disk drive (HDD) controller, comprising:
a channel module configured to read and write data to a magnetic medium; and
a control module configured to
define a first area and a second area of the magnetic medium, wherein the first area does not overlap the second area,
using the channel module, cache data corresponding to addresses within the second area within the first area,
using the channel module, cache data corresponding to a first set of addresses in the second area, wherein the addresses of the first set of addresses correspond to locations in the first area, and
using the channel module, store the data corresponding to the first set of addresses sequentially in a predetermined order in the second area, the predetermined order being based on an order of expected retrieval.

52. The HDD controller of claim 51, wherein the second area comprises outer tracks of the magnetic medium, and the first area comprises inner tracks of the magnetic medium.

53. The HDD controller of claim 51, wherein the control module maintains an index of addresses corresponding to data cached in the second area.

54. The HDD controller of claim 53, wherein the control module stores the index within a subarea of the second area.

55. The HDD controller of claim 51, wherein the control module caches data that is frequently accessed in the second area.

56. The HDD controller of claim 51, wherein the control module receives the first set of addresses from a host.

57. The HDD controller of claim 51, wherein the control module caches data corresponding to a second set of addresses in the second area prior to shutting down, wherein the addresses of the second set of addresses are located in the first area.

58. The HDD controller of claim 57, wherein the control module receives the second set of addresses from a host.

59. The HDD controller of claim 57, wherein the control module stores the data corresponding to the second set of addresses sequentially in a predetermined order in the second area, the predetermined order being based on an order of expected retrieval.

60. The HDD controller of claim 51, wherein the control module caches data in the second area prior to writing the data to the first area.

61. An HDD, comprising:
the HDD controller of claim 51; and
a hard disk assembly including the magnetic medium.

62. A method for operating a hard disk drive (HDD) controller, the method comprising:
reading and writing data to a magnetic medium;
defining a first area and a second area of the magnetic medium, wherein the first area does not overlap the second area;
caching data corresponding to addresses within the second area within the first area;
caching data corresponding to a first set of addresses in the second area, wherein the addresses of the first set of addresses correspond to locations in the first area; and
storing the data corresponding to the first set of addresses sequentially in a predetermined order in the second area, the predetermined order being based on an order of expected retrieval.

63. The method of claim 62, wherein the second area comprises outer tracks of the magnetic medium, and the first area comprises inner tracks of the magnetic medium.

64. The method of claim 62, further comprising maintaining an index of addresses corresponding to data cached in the second area.

65. The method of claim 64, further comprising storing the index within a subarea of the second area.

66. The method of claim 62, further comprising caching data that is frequently accessed in the second area.

67. The method of claim 62, further comprising receiving the first set of addresses from a host.

68. The method of claim 62, further comprising caching data corresponding to a second set of addresses in the second area prior to shutting down, wherein the addresses of the second set of addresses are located in the first area.

69. The method of claim 68, further comprising receiving the second set of addresses from a host.

70. The method of claim 68, further comprising storing the data corresponding to the second set of addresses sequentially in a predetermined order in the second area, the predetermined order being based on an order of expected retrieval.

71. The method of claim 62, further comprising caching data in the second area prior to writing the data to the first area.

* * * * *